UNITED STATES PATENT OFFICE.

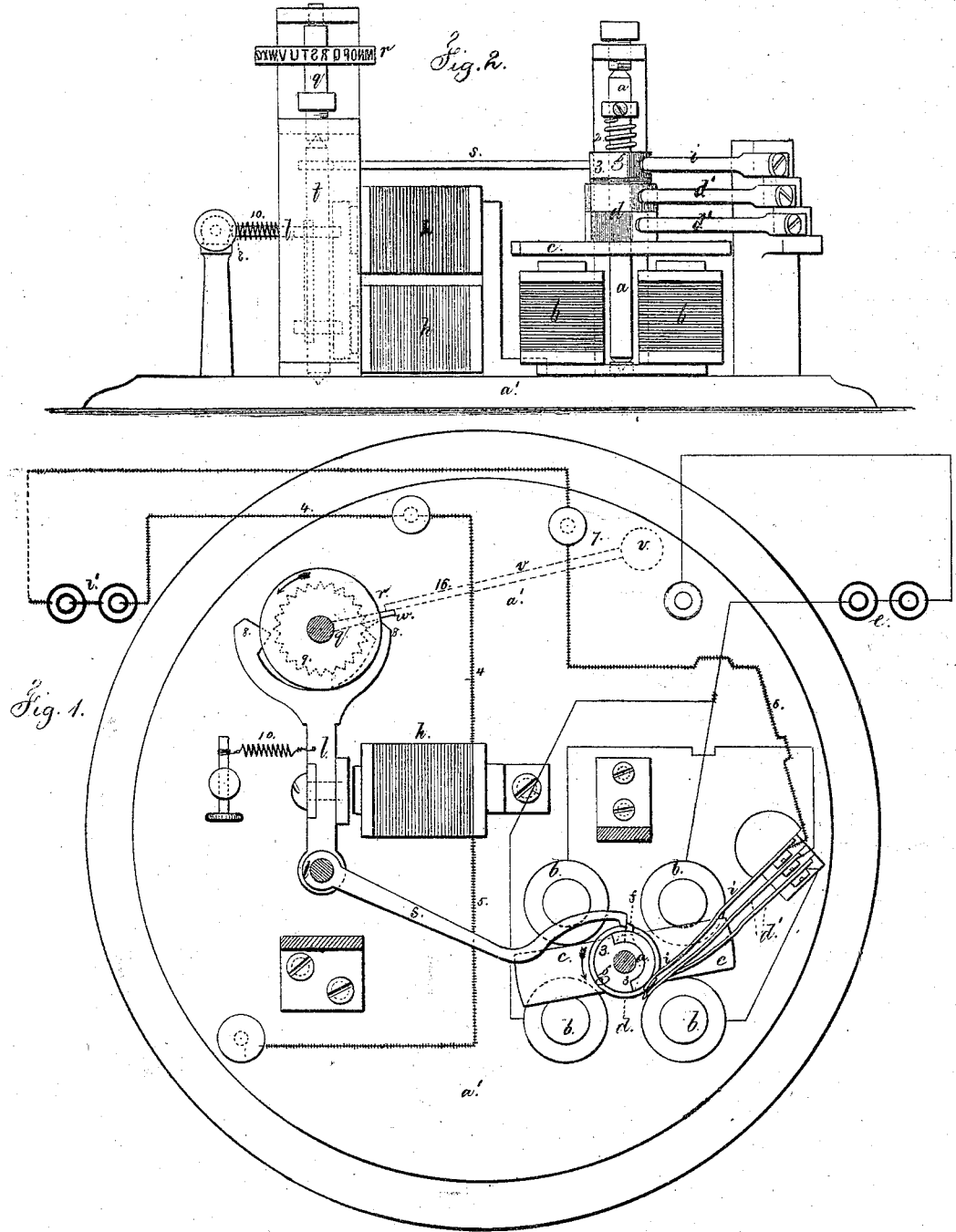

THOMAS A. EDISON, OF NEWARK, NEW JERSEY.

IMPROVEMENT IN PRINTING-TELEGRAPH INSTRUMENTS.

Specification forming part of Letters Patent No. 134,866, dated January 14, 1873.

*To all whom it may concern:*

Be it known that I, THOMAS A. EDISON, of Newark, in the county of Essex and State of New Jersey, have invented certain Improvements in Telegraph Instruments, of which the following is a specification:

This instrument is adapted to receiving and transmitting; and the transmitter is somewhat similar to that shown in Letters Patent granted to me January 23, 1872, No. 123,005, there being a pulsator upon a revolving shaft to open and close the main circuit as in said patent, and the pulsations operate through a magnet in the transmitter, and also in the receiving-machines to rotate their respective type-wheels by a step-by-step movement.

My present improvement relates only to the transmitting portion of the instrument; and the same consists of means for arresting the movement of the pulsator, when a finger-key is depressed for the purpose of breaking the circuit to the type-wheel magnets, and stopping the type-wheels at a letter corresponding with the depressed key.

I make use of a stop-arm vibrated by the type-wheel lever to arrest the movement of the pulsator, and this stop-arm is vibrated clear of a pin upon the pulsator each time the pulsator opens the circuit to the type-wheel magnets, while said circuit is being opened and closed to send pulsations to rotate the type-wheels; but when a finger-key is depressed to stop said type-wheels, this stop-arm is kept in the path of the pin and stops the pulsator with a circuit-closer upon its non-conducting portion, which breaks the circuit to the type-wheel magnets, and arrests all the type-wheels at the same point. When the key is liberated the type-wheel lever, by its spring, moves the stop-arm from the pin, and allows the pulsator to revolve with its shaft and open and close the main circuit, as before.

It is to be understood that in the receiving-machines this pulsator is stationary, the pulsations passing direct to the type-wheel magnets, energizing the same, and giving the step-by-step movement to rotate the type-wheels, and that the devices herein described are brought into action for transmitting from the machine sending the message.

In the drawing, Figure 1 is a sectional plan showing my improvements; and Fig. 2 is an elevation of the same.

The vertical shaft $a$ is rotated continuously by the electro-motor, composed of the electro-magnets $b\ b$, armature $c$, circuit breakers and arms $d\ d'$, and connections to the battery $e$, all of which are of usual character. $g$ is the pulsator, revolving by frictional contact with the shaft $a$, through the agency of the spring 2, and said pulsator is made with the conducting and non-conducting portions, as shown most clearly in Fig. 1; and $f$ is a pin projecting from said non-conducting portion of $g$.

At each revolution of the pulsator $g$ the circuit is opened and closed once to the type-wheel magnet $h$, the circuit being closed when the insulated arm $i$ is in contact with the conducting portion 3 of the pulsator, and the pulsations pass by the wire 4 to said magnet $h$, and thence, by the wire 5, bed $a'$, shaft $a$, pulsator $g$, insulated arm $i$, and wire 6, to the insulated binder 7, to which the main-line wire is connected, and by this wire the pulsations pass to and through the type-wheel magnets of the receiving-machines at the distant stations, and return by the earth portion of the circuit. These pulsations act in the magnet $h$ of the transmitter, and also in the same magnets of the receiving-machine, to rotate the type-wheels $r$ by a step-by-step movement, by means of the lever $l$, pallets 8 8, and toothed wheel 9 upon the shaft $q$.

I will now describe how the pulsator is arrested in its movement to break the circuit to the type-wheel magnets and stop the type-wheels.

The finger-keys are in a semicircular range or ranges, as in aforesaid patent, and concentric with the shaft $q$; one of said keys is shown at $v$ by dotted lines. $w$ is an arm upon the shaft $q$. $s$ is an arm upon the axis $t$ of the lever $l$, and the outer end of said arm is contiguous to the pulsator $g$ during each half revolution of said pulsator, when the circuit is closed to the type-wheel magnet $h$, and is moved away from the same by the back movement of the lever $l$ during the other half revolution, when the circuit is broken to said magnet; hence said arm does not obstruct the movement of the pulsator while the circuit to the magnet $h$ is being opened and closed to rotate the type-wheels. When a finger-key is depressed its arm, 16, is brought in the path of the arm $w$, whose movement it arrests and stops the shaft $q$. The arm $w$ is located with reference to the position of the teeth of 9, so that when said wheel is stopped it holds the lever $l$ in the position shown in Fig. 1, with the stop-arm $s$ in the path of the pin $f$, and said arm stops the pulsator with the circuit-closer $i$ upon the non-conducting portion of the same, which breaks the circuit to the magnet $h$, and also to all the type-wheel magnets of the receiving-machines in the circuit, stopping their type-wheels at the same letter as the wheel $r$, and corresponding with the key depressed.

When the key is liberated the spring 10 completes the backward movement of the armature, type-wheel lever $l$, and pallets 8, giving a slight movement to the wheel 9, and also moving the stop-arm $s$ sufficiently to liberate the pin $f$ and allow the pulsator again to revolve with its shaft, and open and close the circuit to the type-wheel magnets, as before.

The printing lever and magnet are not shown in the drawing, but they may be of usual character, either for the transmitter or receiver, and be operated in any desired manner to effect the printing when the type-wheels are stopped.

I claim as my invention—

1. The stop-arm $s$, connected with the lever $l$ and pallets 8, in combination with the pulsator $g$, and stop $f$ for arresting the movement of the pulsator, substantially as set forth.

2. The type-wheel magnet $h$, in the circuit that is opened and closed by the pulsator $g$, in combination with a stop that arrests the movement of the pulsator when the circuit is broken, and a spring, or its equivalent, that liberates the pulsator upon completing the backward movement of the armature and pallets, substantially as set forth.

Signed by me this 16th day of October, 1872.

T. A. EDISON.

Witnesses:
GEO. T. PINCKNEY,
CHAS. H. SMITH.